United States Patent
Fattor et al.

[15] 3,675,898
[45] July 11, 1972

[54] DEVICES FOR DRAWING WIRES THROUGH CONDUITS

[72] Inventors: Arthur P. Fattor, 5380 S. Holly St., Littleton, Colo. 80120; William Hortensius, 8278 Cherokee St., Denver, Colo. 80221

[22] Filed: Jan. 29, 1970

[21] Appl. No.: 6,722

[52] U.S. Cl............254/134.3 FT, 24/132 HL, 24/134 QA
[51] Int. Cl.........................................F16g 11/00
[58] Field of Search........24/132 HL, 134 QA, 134 P, 134 Q, 24/134 KB, 134; 339/274; 287/79, 78, 83, 114, 118; 259/134.3 FT; 81/3

[56] References Cited

UNITED STATES PATENTS

| | | | |
|---|---|---|---|
| 230,435 | 7/1880 | Pitney | 24/134 |
| 297,509 | 4/1884 | Doremus | 24/134 |
| 418,413 | 12/1889 | Johns | 24/134 |
| 895,590 | 8/1908 | Sprague | 24/18 |
| 2,590,886 | 4/1952 | Pedersen | 339/224 X |
| 2,620,534 | 12/1952 | Berger | 24/134 Q UX |

FOREIGN PATENTS OR APPLICATIONS

| | | | |
|---|---|---|---|
| 166,617 | 8/1950 | Austria | 24/134 Q |
| 919,938 | 11/1954 | Germany | 24/134 Q |

*Primary Examiner*—Bernard A. Gelak
*Attorney*—B. Van Vakenburgh and Frank C. Lowe

[57] ABSTRACT

A substantially cylindrical plug-like clamp having a rectangular socket in one extremity, to receive the wires, and a circular socket in the other extremity, to receive a flexible tension element or fishing tape. A lever-actuated, flat shaft transversally crosses the rectangular socket which, when rotated, clamps insulated wires in the latter socket and a screw-actuated nipple in the circular socket acting to secure the extremity of a fishing tape in the latter socket.

10 Claims, 5 Drawing Figures

PATENTED JUL 11 1972 3,675,898
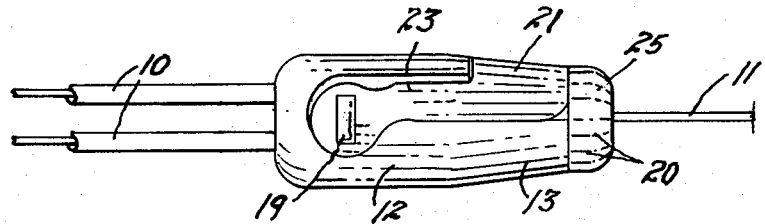
Fig. 1
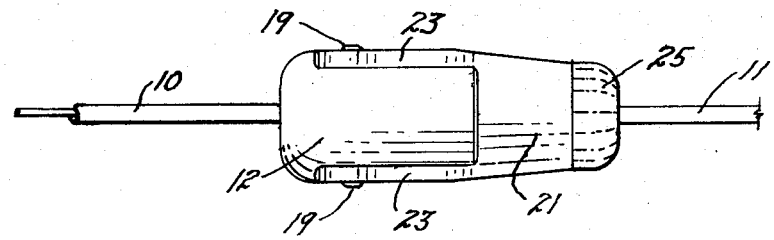
Fig. 2
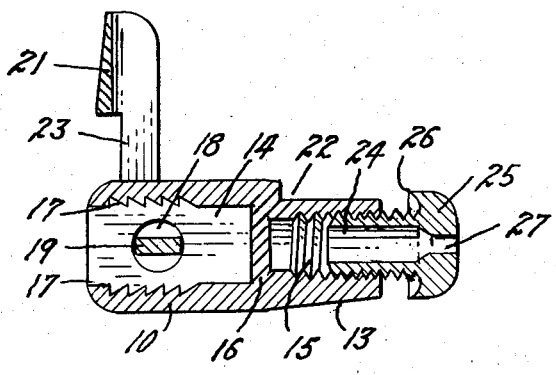
Fig. 3
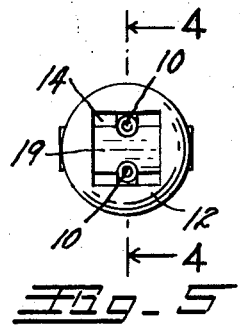
Fig. 5
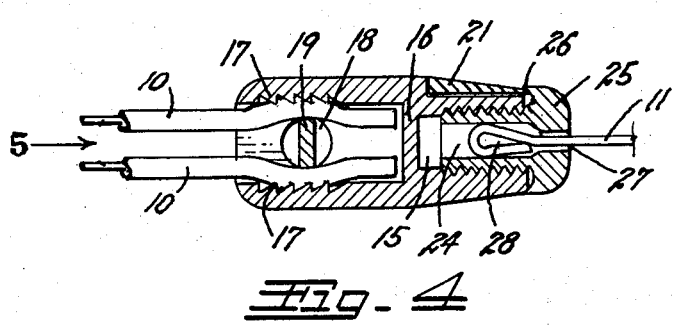
Fig. 4
INVENTORS
ARTHUR P. FATTOR
WILLIAM HORTENSIUS
BY
ATTORNEY

DEVICES FOR DRAWING WIRES THROUGH CONDUITS

OBJECTS

Conduit wiring jobs in buildings require that flexible tension elements, usually known as fishing tapes, be initially trained through the conduits. The leading extremities of the wires to be installed are then attached to the trailing extremity of the flexible tension element and the latter is drawn upon to pull the wires through the conduits.

The attachment of the wires to the flexible elements presents quite a problem especially when there is a plurality of wires. In most cases the extremities of the wires are twisted together and physically attached to the tape extremity in some manner such as by hooking or wrapping. This creates a bulky irregular and inflexible joint which is difficult to pull through the many bends in the conduit and which is subject to wire breakage and disconnections under the extreme tensions at times required.

This invention relates to means for connecting a flexible tension element such as a fishing tape to a plurality of trailing wires in an electrical conduit and has for its principal object the provision of neat and efficient cylindrical double ended clamp device, in one extremity of which, the ends of a plurality of insulated wires can be instantly and simultaneously clamped and in the other extremity of which the trailing end of the fishing tape can be quickly and securely attached so the wires can be quickly and easily attached to the tape and readily drawn through the conduit.

Clamps for the above purpose have been attempted requiring special tools and a plurality of actuating elements but these have been time consuming and erratic in operation. A further object of the present invention is to provide a hand operated, clamp device for the above purpose which can be completely attached for use and completely detached after use without the use of tools.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a side elevational view of the improved clamp device of this invention in the closed position with the wires and fishing tape attached to and projecting therefrom;

FIG. 2 is a top plan view of FIG. 1;

FIG. 3 is a vertical, longitudinal section through the clamp device, per se, in the completely open position;

FIG. 4 is a similar longitudinal section, taken on the line 4—4, FIG. 5, showing the clamp device in the completely closed position of FIG. 1 with the wires and tape in place therein; and FIG. 5 is a rear view of the device looking in the direction of the arrow 5 in FIG. 4.

The wires to be drawn through the conduit are indicated at 10 and a conventional fishing tape is indicated at 11.

The improved clamp device comprises an elongated coupling block the rear portion of which, shown at 12, is cylindrical and the forward portion of which is gradually reduced in diameter to form a conical forward extremity 13. A square, axially extending, wire cavity 14 is formed in the cylindrical rear portion 12 and a smaller axially extending, cylindrical, threaded, tape cavity 15 is formed in the conical forward extremity 13. The two cavities are separated by a dividing abutment 16.

The upper and lower horizontal, internal, flat surfaces of the square wire cavity 14 are provided with straight, laterally extending and forwardly directed, wire engaging ratchet teeth 17. The flat vertical sides of the square wire cavity 14 are plain and unobstructed. Aligned bearing openings 18 extend laterally through the latter vertical sides parallel to, and midway between, the upper and lower horizontal surfaces to rotatably receive an elongated, flat axle member 19 which projects outwardly at both sides of the cylindrical rear portion 12 of the coupling block. A 90° rotation can be applied to the flat axle member by means of a bifurcated lever member which comprises an arcuate bridge portion 21, contoured to conform in shape and placement to the conical extremity 13, and which, when closed, fits into a form-fitting indentation 22 in the conical forward extremity. A lever leg 23 is formed on each side of the bridge portion 21. The lever legs are parallel and extend to, and are riveted over, the projecting extremities of the flat axle member 19 so as to rotate unitarily therewith.

A tubular threaded nipple 24 is threaded into the tape cavity 15. The nipple is provided with a flanged head 25 which clamps against the front of the conical forward extremity 13 of the coupling block. The head 25 is provided with an annular, rearwardly extending, sharpened, circumferential flange 26 which, when tightened, engages the arcuate forward extremity of the bridge portion 21 to lock the latter in the closed conforming position of FIGS. 1, 2 and 4. The head 25 of the nipple 24 is provided with an axially positioned tape opening 27 through which the extremity of the fishing tape 11 is passed and secured.

As illustrated, the fishing tape is of the conventional flat, flexible spring steel variety in which the trailing extremity of the tape has been heated, annealed and bent into a terminal loop 28, as shown in FIG. 4 which prevents withdrawal of the tape through the tape opening 27. Nylon cords have been recently adopted as conduit fishing tapes. The cords are blown through the conduits by compressed air. In the latter cases the trailing extremity of the cord is passed through the tape opening 27 and knotted in the hollow nipple 24 to prevent withdrawal through the tape opening 27.

In this invention the term "fishing tape" includes any tension device employed for drawing the clamp device through a conduit and the words "horizontal" and "vertical" refer to positions as illustrated on the drawing.

OPERATION

It is believed the use of the improved clamp device can be readily understood from the above description. Briefly, let us assume: that the trailing extremity of the tape has been secured in the nipple 24; that the nipple 24 has been partially threaded into the tape cavity 15, as shown in FIG. 3; that the bridge portion 21 is in the open position with the flat axle member 19 in the horizontal position of FIG. 3; and that the entering extremities of the wires 10 have been pressed into the wire cavity 14 above and below, respectively, the flat axle member 19. The bridge member is now thumb-pressed forwardly and downwardly into its receiving indentation 22 to rotate the flat axle member to the vertical position of FIG. 4 so as to crush the insulation of the wires against the upper and lower ratchet teeth in the wire cavity, as shown in FIG. 4, so as to fixedly lock the wires in place. The nipple 24 is now tightly threaded into the tape cavity to cause the circumferential flange 26 on the head 25 to lock the bridge portion in its indentation 22, as shown in FIG. 4, and the device is ready for pulling the wires through the conduit. After the pulling has been completed, the wires can be instantly released by simply loosening the nipple 24, to release the flange 26 of the head 25 from its clamping engagement with the extremity of the bridge portion 21, and then lifting the bridge portion to the position of FIG. 3.

While only two insulated wires have been indicated on the drawing, additional wires can be attached by simply inserting them along opposite sides of the flat axle member parallel to the wires shown.

To assist hand-tightening and loosening of the nipple 24, the head 25 is preferably knurled as indicated at 20 for thumb and finger engagement.

While a selected form of the invention has been above described, it is understood that mechanical variations and detail substitutions can be made by one skilled in the art without departing from the spirit of the invention.

Having thus described the invention, what is claimed and desired to be secured by Letters Patent is:

1. A clamp device for attaching a plurality of wires to a fishing tape for drawing the wires through a conduit comprising:
   a. an elongated substantially cylindrical coupling block having an outer diameter less than the inner diameter of said conduit;
   b. a wire-receiving cavity extending axially inward from the rear extremity of said block, said cavity having opposed internal surfaces, said cavity receiving said wires so that said wires extend in a generally axial, rearward direction from said block;
   c. means for clamping the ends of the wires radially outward against the opposed internal surfaces in said cavity;
   d. lever means for actuating said clamping means and being positioned within the lateral confines of said cylindrical block in clamping position; and
   e. means for detachably attaching a fishing tape to the forward extremity of said block, said attaching means being within the lateral confines of said coupling block and attaching said fishing tape so that said fishing tape will extend in a forward axial direction from said block.

2. A clamp device as described in claim 1 in which the opposed internal surfaces are provided with:
   a. ratchet-like, forwardly directed teeth.

3. A clamp device as described in claim 1 in which the means for clamping the wires comprises:
   a. a rotatable flat-sided axle member extending transversally across said block and across said cavity between the side surfaces thereof and intermediate the upper and lower surfaces thereof; and
   b. said lever means being attached to said axle member externally of said block for rotating the latter from a horizontal open position to receive said wires to a vertical closed position to compress the wires against said upper and lower internal surfaces.

4. A clamp device as described in claim 3 in which the lever means comprises:
   a. a U-shaped, bifurcated lever member having two legs joined by a connecting bridge portion;
   b. means for fixedly attaching the extremities of the two legs to the extremities of said axle member exteriorly of said block so that when said lever member is swung toward and away from said block said axle member will respectively rotate to the closed and open positions.

5. A clamp device as described in claim 4 having:
   a. a conical forward extremity on said block, said bridge portion having a semi-conical contour to align and fit against the conical forward extremity of said block when in the closed position.

6. A clamp device as described in claim 5 in which:
   a. a contoured indentation formed in the conical forward extremity of said block into which said bridge portion is interfitted when in the closed position.

7. A clamp device as described in claim 5 in which the means for detachably attaching a fishing tape comprises:
   a. a threaded tape cavity extending axially inward from the conical forward extremity of said block;
   b. a tubular nipple threaded into said tape cavity; and
   c. a head formed on said nipple positioned to contact and retain said bridge portion in the closed position.

8. A clamp device as described in claim 7 having:
   a. an axial opening in the head of said cap for receiving and attaching a fishing tape in said tape cavity.

9. A clamp device as described in claim 8 in which:
   a. said cap is externally knurled to facilitate thumb and finger engagement therewith.

10. A clamp device as described in claim 1 in which the means for detachably attaching a fishing tape comprises:
    a. a threaded tape cavity extending axially inward from the conical forward extremity of said block;
    b. a tubular nipple threaded into said tape cavity; and
    c. a head formed on said nipple positioned to contact and retain said bridge portion in the closed position.

* * * * *